United States Patent Office 3,208,819
Patented Sept. 28, 1965

3,208,819
METHOD FOR DECONTAMINATING NUCLEAR FUELS CONTAINING RUTHENIUM COMPLEXES
Richard M. Wallace, Aiken, S.C., assignor to the United States of America as represented by the United States Atomic Energy Commission
No Drawing. Filed June 19, 1963, Ser. No. 289,147
16 Claims. (Cl. 23—14.5)

This invention relates to a method for improving the decontamination of neutron-irradiated nuclear fuels from each other and from their fission products and more particularly to a method for improving the decontamination of uranium and plutonium from ruthenium by solvent extraction of nitric acid solutions containing these fuels.

In the reprocessing of nuclear fuels, the fuel values, such as uranium and plutonium, may be separated from the fission products by solvent extraction of aqueous mineral acid solutions with the uranium and plutonium subsequently being separated from each other by stripping first one and then the other from an organic extract back into an aqueous stream. One such method is known as the Purex process, which is fully described in U.S. Patent No. 2,990,240, issued June 27, 1961, in the names of Charles N. Ellison and Thomas C. Runion, for "Process for Segregating Uranium From Plutonium and Fission Product Contamination." While this process, generally, affords good decontamination of the bulk of the fission products present in the aqueous solution from the fuel values, good decontamination with respect to ruthenium remains a serious problem. This is generally attributed to the fact that ruthenium in aqueous nitric acid solutions forms a family of nitrosylruthenium complexes some of which are preferentially attracted to the organic phase and others of which are preferentially attracted to the aqueous phase; thereby not affording a sharp separation of the ruthenium into either the aqueous or the organic phase.

Heretofore various materials have been used in solvent extraction processes, such as mentioned above, to react with the ruthenium to render it less extractable into the organic phase. Of these materials tried, hydrazine has been the most effective in rendering the ruthenium less extractable in the organic phase, but, at best, it only partially suppresses this ruthenium extraction. Also, hydrazine is not ideally suited for use in solutions of high acidity which are frequently encountered in solvent extraction processes because its ability to suppress the extraction of ruthenium into the organic phase is markedly reduced in such high acid media. It has been found that prolonged heating of nitric acid solutions of plutonium containing hydrazine results in the reduction of the highly extractable tetravalent plutonium to the inextractable trivalent state and attempts to re-oxidize the trivalent to the tetravalent state with nitrous acid resulted in the reformation of nitrosylruthenium. Thus, the use of hydrazine could interfere in a solvent extraction process in which the plutonium undergoes a valence adjustment to the tetravalent state to finally separate it from the uranium by reducing the tetravalent plutonium to the trivalent state. Consequently, the use of such materials as hydrazine for improving the decontamination of ruthenium from uranium and plutonium by solvent extraction has left much to be desired in finding a material which will not only react with the ruthenium to render it completely inextractable in the organic phase but also which will be compatible with subsequent steps to recover the nuclear fuels. Especially, is this true in processes where both uranium and plutonium must be separated from not only the fission products and other contaminants but also from each other.

Accordingly, the general object of this invention is to provide a method for improving the decontamination of neutron-irradiated nuclear fuels from each other and their fission products.

Another object is to provide a method for improving the decontamination of uranium and plutonium from ruthenium by solvent extraction of an aqueous mineral acid solution in the reprocessing of nuclear fuels.

Still another object is to provide a method for inhibiting the extraction of nitrosylruthenium complexes into organic solvents employed in a process of the type referred to above.

A further object is to provide a method for rendering nitrosylruthenium complexes completely inextractable in tri-n-butyl phosphate solvent in the reprocessing of uranium and plutonium by solvent extraction of nitric acid solutions.

A still further object is to provide a method for pretreating an aqueous nitric acid solution containing uranium, plutonium, and fission products to improve the decontamination of the uranium and plutonium from the fission products.

Another object is to provide a method for improving the decontamination of uranium and plutonium from ruthenium in aqueous nitric acid solutions by an ion exchange process in the reprocessing of nuclear fuels.

In accordance with the present invention, there is provided a method for improving the decontamination of neutron-irradiated nuclear fuels from their fission products in aqueous solutions, which comprises the steps of adding barbituric acid ($C_4H_4O_3N_2$) to the aqueous solution and digesting same at elevated temperatures. The invention also provides a method of improving the decontamination of uranium and plutonium from ruthenium by solvent extraction of an aqueous nitric acid solution in the reprocessing of nuclear fuels which comprises the steps of adding barbituric acid to the nitric acid solution and digesting same prior to said extraction. Barbituric acid treatment of aqueous nitric acid solutions containing uranium, plutonium and ruthenium has markedly increased the decontamination factors heretofore achieved with respect to ruthenium. In a process for the decontaminating of fuel values from their fission products, such as a solvent extraction process, the addition of barbituric acid has been found to reduce the amount of ruthenium extracted into the organic phase by a factor greater than 1000 as compared to a factor of 25 with the addition of hydrazine.

The exact mechanism by which the barbituric acid reacts with the nitrosylruthenium complexes to render them completely inextractable in the organic phase is quite complicated and is not completely understood. However, spectrophotometric studies have shown that there are at least three and possibly four consecutive reactions. Also, three, and possibly more, distinct reaction products have been observed.

The exact stoichiometric ratio of barbituric acid to ruthenium is unknown, but at least a mole of barbituric acid per mole of ruthenium is used. Typical solutions in such a solvent extraction process contain approximately 0.0001 M ruthenium and it is greatly preferred that the barbituric acid be in substantial excess, e.g., sufficient to make the solution 0.05 molar.

While the acidity of the aqueous nitric acid solution may vary over a considerable range, it has been found that the barbituric acid is most effective when the nitric acid concentration is low, preferably from about 0.1 to 0.5 molar. However, the products of reaction were not appreciably affected when the solutions were allowed to stand in 4 M nitric acid for twenty hours at room temperature.

As a special point, after the barbituric acid is added to the aqueous nitric acid solution, the resulting solution is best digested for a period of time at elevated temperatures. It is preferred that this digestion take place at least above 80° C., preferably between 90° C. and 100° C., and for at least as long as one hour, with the time of digesting being dependent upon the concentrations and temperatures of the solution.

It is preferred that the aqueous nitric acid solution be free of nitrous acid which reacts with the reaction products producing several species which are slightly extractable in the organic phase. However, the presence of nitrous acid in the aqeous nitric acid solution does not appreciably effect the decontamination factors of ruthenium afforded by treatment with barbituric acid, providing there is a substantial excess of barbituric acid.

Further illustration of the quantitative aspects and procedures of the present invention is provided in the following examples. In Example I, the effect of barbituric acid as compared to that of hydrazine on solvent extraction of nitrosylruthenium is demonstrated.

EXAMPLE I

Four solutions were prepared containing 4 M $NaNO_3$, 0.01 M $HNO_3$, 0.05 M barbituric acid and about $10^{-3}$ M nitrate nitrosylruthenium which contained trace amounts of $Ru^{106}$. Four other solutions were prepared containing the same constituents with the exception that the solution was 0.5 M $HNO_3$. Similarly, eight other solutions were prepared with the exception that the solution contained 0.05 M hydrazine instead of barbituric acid. Also, eight solutions were prepared as controls with neither hydrazine nor barbituric acid present. The solutions were heated to 90° C. for periods varying from one to seven hours, cooled to room temperature, and extracted with an equal volume of 30% tri-n-butyl phosphate. The extractant in each case was counted and the gamma activity was compared with that of the extractant from a control run. These solutions simulate dissolver solutions as far as acidity and nitrate ion concentration are concerned. The results are shown in Table I.

Table 1.—*Effect of barbituric acid and hydrazine on extraction of nitrosylruthenium into 30% TBP*

|  | Time, hr. | Ru activity in extractant, γ counts/(minute) (ml.) | | |
| --- | --- | --- | --- | --- |
|  |  | Control | Barbituric acid (0.05 M) | Hydrazine (0.05 M) |
| With 0.01 M $HNO_3$, 4 M $NaNO_3$. | 1 | 3.26×10⁴ | 2.30×10³ | 2.04×10³ |
|  | 2 | 3.19×10⁴ | 2.53×10² | 1.48×10³ |
|  | 4 | 3.06×10⁴ | 0 | 1.38×10³ |
|  | 7 | 3.11×10⁴ | 0 | 1.30×10³ |
| With 0.5 M $HNO_3$, 4 M $NaNO_3$. | 1 | 2.83×10⁴ | 1.17×10⁴ | 1.77×10⁴ |
|  | 2 | 2.72×10⁴ | 4.58×10³ | 1.63×10⁴ |
|  | 4 | 2.79×10⁴ | 7.98×10³ | 1.12×10⁴ |
|  | 7 | 2.74×10⁴ | 66 | 7.92×10³ |

Table I shows that while both hydrazine and barbituric acid were effective in suppressing the extraction of ruthenium, barbituric acid treatment for four hours afforded more than a thousandfold increase in decontamination at 0.1 M $HNO_3$. Table I also shows that both were more effective in solutions of lower acidity. Example II demonstrates the effect of barbituric acid on simulated Purex solutions.

EXAMPLE II

Four solutions containing 1.3 M uranyl nitrate, 0.5 M $HNO_3$ and $1\times10^{-4}$ M nitrosylruthenium traced with $Ru^{106}$ were prepared. One solution was used as a control run and various quantities of barbituric acid were added to the other three solutions. The solutions were refluxed at a temperature of about 105° C. for a predetermined time and were then extracted with 30% tri-n-butyl phosphate. The solvent-to-aqueous volume ratio in the first extraction was 3:1 for quick uranium removal and a 1:1 ratio was employed in the second and third extractions. For the control sample, the maximum ruthenium activity was obtained in the third extract. As a result, the activity of the third extract was chosen as an indication of the amount of extractable ruthenium present. The results are shown in Table II below.

Table II.—*Effect of barbituric acid on extraction of nitrosylruthenium from simulated Purex feed*

| Treatment | Time, hr. | Ru extracted, percent |
| --- | --- | --- |
| Control |  | 5.2 |
| 0.01 M barbituric acid | 1 | 0.4 |
| 0.025 M barbituric acid | 1 | <0.1 |
| 0.05 M barbituric acid | 0.5 | <0.1 |

The results in Table II illustrate that the uranium does not interfere with the extraction of ruthenium by barbituric acid. Refluxing the solutions for 30 minutes with 0.5 M barbituric acid and for one hour with 0.025 M barbituric acid decreased the amount of extractable ruthenium below the limit of detection. In most solvent extraction processes, the acid concentration is increased prior to solvent extraction and it is therefore imperative that the reaction products of any treatment to improve decontamination must be fairly stable in high acid media. Example III demonstrates the stability of the inextractable compounds formed by the barbituric acid treatment.

EXAMPLE III

Three solutions containing 0.1 M $HNO_3$, 4 M $NaNO_3$, and trace quantities of nitrate nitrosylruthenium were made. One solution was used as a control, one was made 0.05 M hydrazine, and the third solution was made 0.05 M barbituric acid. The inextractable ruthenium complexes formed by the reaction with barbituric acid and hydrazine were produced by heating the solutions at 90° C. for one hour; then, the solutions were adjusted to 4 M $HNO_3$ and allowed to stand at room temperature. At intervals, aliquots of the solutions were removed, diluted to 2 M $HNO_3$, equilibrated with 30% tri-n-butyl phosphate and the ruthenium gamma activity in the organic phase was measured. The results are shown in Table III below.

Table III.—*Stability of inextractable ruthenium compounds in 4 M $HNO_3$*

| Time at room temperature, hr. | Ru activity in extractant, γ counts/ (minute) (ml.) | | |
| --- | --- | --- | --- |
|  | Control | Hydrazine | Barbituric acid |
| 0 | 1.1×10⁴ | 2.0×10³ | 1.7×10³ |
| 1 | 1.1×10⁴ | 2.5×10³ | 2.4×10³ |
| 2 | 1.4×10⁴ | 2.4×10³ | 2.2×10³ |
| 4 | 1.4×10⁴ | 2.7×10³ | 2.9×10³ |
| 20 | 1.4×10⁴ | 2.7×10³ | 3.7×10³ |

The results in Table III show the stability of the reaction products formed by the addition of barbituric acid to aqueous nitric acid solutions and the suitability of using barbituric acid in a solvent extraction process which has high acid solutions.

The present invention is equally applicable to processes for the decontamination of neutron-irradiated nuclear fuels from each other and from their fission products in which an aqueous solution containing at least one of the nuclear fuels and its fission products is passed through an ion-exchange resin column to concentrate and separate the nuclear fuel. A serious drawback to the use of ion exchange columns for concentrating and separating neutron-irradiated nuclear fuels from their fission products has been the problem of accumulation of the fission products on the ion exchange resin; thus posing a radiation hazard. Inasmuch as the products of reaction between barbituric acid and ruthenium have been found to be largely anionic, treatment of ion exchange column feed solutions with barbituric acid affords a reduction in the ruthenium absorbed on the ion exchange resin. This is shown in the following example.

EXAMPLE IV

Seven solutions were made by adding about $10^{-3}$ M nitrosylruthenium containing trace amounts $Ru^{106}$ to 0.2 M nitric acid. Two solutions with no reagents added were used as controls. The other five solutions were made 0.05 M barbituric acid. To simulate Purex solutions two of the five solutions containing 0.05 M barbituric acid were made 0.04 M hydroxylamine sulfate. The solutions were then held at various temperatures for a predetermined length of time and then 5 ml. of each solution was fed to a 5-mm.-I.D ion exchange column containing 1 ml. of "Dowex" 50-X8, 50-100 mesh resin. Each time the column was washed with 20 ml. of 0.2 M nitric acid. Fresh resin was used for each experiment and was analyzed each time for $Ru^{106}$ activity. The feed effluent and washes each time were combined and analyzed for $Ru^{106}$ activity. The results are shown in Table IV.

Table IV.—Effect of feed treatments on absorption of nitrosylruthenium by "Dowex" 50

| Treatment | Time, hr. | Temperature, °C. | Ru absorbed, percent |
| --- | --- | --- | --- |
| Control | 16 | 25 | 84 |
|  | 1 | 85 | 89 |
| 0.05 M barbituric acid | 1 | 85 | 3.1 |
|  | 2 | 85 | 0.97 |
|  | 4 | 85 | 0.58 |
| 0.05 M barbituric acid, 0.04 M hydroxylamine sulfate. | 1 | 85 | 7.6 |
|  | 4 | 85 | 3.1 |

Table IV shows that pretreatment of feed solutions to a cation exchange column substantially reduced the amount of ruthenium absorbed on the cation exchange resin. Only 0.6 to 0.9% of the ruthenium was absorbed from solutions that were treated with 0.05 M barbituric acid and heated at 85° C. When the feed solutions were adjusted to 0.04 M hydroxylamine sulfate and treated with 0.05 M barbituric acid only about 7 to 8% ruthenium was absorbed after heating for 1 hour at 85° C.

In the solvent extraction processes mentioned above, such as the Purex process, the plutonium solution, which results from the uranium separation step, is concentrated by passing the solution through a cation exchange resin column whereupon the plutonium is absorbed on the resin, this being known as the plutonium coupling step, and then is eluted from the resin with concentrated nitric acid. When the plutonium solution is passed through the column, a portion of the ruthenium is absorbed along with the plutonium and, upon subsequent elution of the plutonium, some of the ruthenium remains and accumulates on the resin, thereby eventually producing a very high radiation field in the vicinity of the column. Pretreatment of the feed solutions in the ion exchange coupling step for plutonium with barbituric acid substantially reduces the amount of ruthenium absorbed on the cation exchange resin. This is shown in the following example.

EXAMPLE V

A synthetic solution was prepared containing 1 gram/liter of plutonium, 0.025 M hydroxylamine sulfate, 0.2 M nitric acid and nitrate nitrosylruthenium complexes. One half of the solution was treated with barbituric acid and the untreated fraction was used in control runs. The barbituric acid treatment consisted of making the solution 0.05 M barbituric acid and heating the solution for 2 hours at 90° C. The treated and untreated solutions were processed through a simulated cation exchange coupling step that was scaled down from plant conditions by a factor of one thousand. The solutions were passed downflow through a cation exchange resin column absorbing the plutonium and portions of the ruthenium on the resin. Then, to simulate the removal of any uranium, which might be present (as is the case in the actual process), from the resin a solution of 0.25 M hydroxylamine sulfate was passed downflow through the column and finally the plutonium was eluted from the resin by passing upflow through the column a 5.7 M nitric acid solution. Feed solutions, feed effluents, and eluates were analyzed for plutonium and ruthenium. Fresh "Dowex" 50 resin was used for each experiment and was analyzed for ruthenium that was permanently retained. The results are shown in Table V.

Table V.—Effect of barbituric acid treatment on absorption of nitrosylruthenium by "Dowex" 50 from simulated plutonium product solution

|  | Percent of total ruthenium in feed | | |
| --- | --- | --- | --- |
|  | Treated | Untreated | |
|  |  | 1 | 2 |
| Column effluent | 93.0 | 82.0 | 57.0 |
| Uranium elutriate (Simulated) | 2.8 | 0.1 | 0.4 |
| Product (Pu) eluate | 7.0 | 17.0 | 40.0 |
| Retained by resin | 0.1 | 1.0 | 3.0 |

It is to be noted that the percentage of ruthenium found in the various effluent and eluate streams totals more than 100%. However, this is believed to be within statistical error.

The results in the foregoing example demonstrate that the barbituric acid treatment decreases absorption of ruthenium on the cation exchange resins during the feed absorption step (indicated by an increase in the percent ruthenium in the column effluent) and also decreases the amount of ruthenium permanently retained by the resin. Of special interest is the finding that while the barbituric acid treatment effectively suppresses the absorption of ruthenium on the cation exchange resin it does not interfere with the absorption of plutonium on the resin. The barbituric acid treatment resulted in less than 0.002% loss of plutonium to the column effluent. Also, of further benefit is the fact that the trivalent plutonium in the resulting solution was stable for about one week after the barbituric acid treatment and that some reduction of tetravalent plutonium occurred during this treatment.

It is to be understood that the foregoing examples are merely illustrative and are not intended to limit the scope of this invention, but the invention should be limited only by the scope of the appended claims.

What is claimed is:

1. In a process for the decontamination of neutron-irradiated nuclear fuels from each other and their fission products including ruthenium complexes, in aqueous solutions, the improvement of adding barbituric acid to said aqueous solution in sufficient quantity to maintain said ruthenium complexes in said aqueous solution and digesting said solution at an elevated temperature.

2. The improvement of claim 1 wherein at least one mole of barbituric acid per mole of ruthenium is added to said aqueous solution.

3. The improvement of claim 1 wherein said solution is digested at a temperature of between about 90° C. and 100° C. for a period of at least one hour.

4. A method for improving the decontamination of neutron-irradiated uranium and plutonium from ruthenium, in the form of nitrosylruthenium complexes, in a solvent extraction process in which the uranium and plutonium are extracted from an aqueous nitric acid solution by an organic solvent comprising adding at least one mole of barbituric acid per mole of ruthenium to said solution and digesting the resulting solution at approximately 90–100° C. for a period of at least one hour.

5. The method of claim 4 wherein said organic solvent is tri-n-butyl phosphate and said solution is made 0.05 molar barbituric acid.

6. In a process for the separation and decontamination of at least one neutron-irradiated nuclear fuel value selected from the group consisting of uranium and plutonium values from a ruthenium-containing aqueous acidic solution containing said values, the improvement which comprises adding barbituric acid to said aqueous solution in sufficient quantity to maintain said ruthenium in said aqueous solution and digesting said solution at an elevated temperature.

7. The improvement of claim 6 wherein at least one mole of barbituric acid per mole of ruthenium is added to said aqueous solution.

8. The improvement of claim 6 wherein said solution is digested at a temperature of between about 90° C. and 100° C. for a period of at least one hour.

9. In a process for the separation and decontamination of at least one neutron-irradiated nuclear fuel value selected from the group consisting of uranium and plutonium values from an aqueous acidic solution containing said values together with nitrosylruthenium complexes and other fission products, the improvement which comprises adding barbituric acid to said aqueous solution in sufficient quantity to maintain said nitrosylruthenium complexes in said aqueous solution and digesting said solution at an elevated temperature.

10. The improvement of claim 9 wherein at least one mole of barbituric acid per mole of ruthenium is added to said aqueous solution.

11. The improvement of claim 9 wherein said solution is digested at a temperature of between about 90° C. and 100° C. for a period of at least one hour.

12. In a solvent extraction process for the separation and decontamination of nuclear fuel values selected from the group consisting of uranium and plutonium from an aqueous acidic solution containing said values together with nitrosylruthenium complexes and other fission products which comprises contacting said aqueous solution with an organic solvent, whereby at least one of said nuclear fuel values is preferentially extracted into said organic solvent, the improvement which comprises providing barbituric acid in said aqueous solution in sufficient quantity to maintain said nitrosylruthenium complexes in said aqueous solution during said solvent extraction and digesting said solution at an elevated temperature prior to contacting said aqueous solution with said organic solvent.

13. In a solvent extraction process for the separation and decontamination of nuclear fuel values selected from the group consisting of uranium and plutonium from an aqueous acidic solution containing said values together with ruthenium, in the form of nitrosylruthenium complexes, and other fission products which comprises contacting said aqueous solution with an organic solvent to preferentially extract at least one of said nuclear fuel values into said organic solvent, the improvement which comprises adding to said aqueous solution at least one mole of barbituric acid per mole of ruthenium present in said aqueous solution and digesting said aqueous solution for a period of at least one hour at a temperature between about 90° C. and 100° C. prior to contacting said solution with said organic solvent.

14. In a solvent extraction process for the separation and decontamination of nuclear fuel values selected from the group consisting of uranium and plutonium from an aqueous nitric acid solution containing said values together with nitrosylruthenium complexes and other fission products which comprises contacting said solution with tri-n-butyl phosphate organic solvent to preferentially extract at least one of said nuclear fuel values into said tri-n-butyl phosphate organic solvent, and subsequently recovering said nuclear fuel value, the improvement comprising providing in said aqueous nitric acid solution at least 0.05 molar barbituric acid and digesting said solution for a period of at least one hour at a temperature between about 90° C. and 100° C. whereby said nitrosylruthenium complexes are rendered inextractable by said tri-n-butyl phosphate organic solvent.

15. In an ion exchange process for the separation and decontamination of nuclear fuel values selected from the group consisting of uranium and plutonium from an aqueous acidic solution containing at least one of said values together with nitrosylruthenium complexes and other fission products which comprises contacting said aqueous solution with an ion exchange resin to absorb at least one of said nuclear fuel values on said resin, whereby said value is recovered, the improvement which comprises providing in said aqueous solution barbituric acid in sufficient quantity to maintain said nitrosylruthenium complexes in said aqueous solution during said ion exchange process and digesting said solution at an elevated temperature prior to contacting said solution with said ion exchange resin.

16. In an ion exchange process for the separation and decontamination of nuclear fuel values selected from the group consisting of uranium and plutonium from an aqueous acidic solution containing at least one of said values together with ruthenium, in the form of nitrosylruthenium complexes, and other fission products which comprises contacting said aqueous solution with an ion exchange resin to absorb at least one of said nuclear fuel values on said resin, whereby said value is recovered, the improvement which comprises adding to said aqueous solution at least one mole of barbituric acid per mole of ruthenium present in said aqueous solution and digesting said aqueous solution for a period of at least one hour at a temperature of between about 90° C. and 100° C. prior to contacting said aqueous solution with said ion exchange resin.

No references cited.

CARL D. QUARFORTH, *Primary Examiner.*